United States Patent
Simmonds et al.

(10) Patent No.: US 8,810,913 B2
(45) Date of Patent: Aug. 19, 2014

(54) PROJECTION DISPLAY

(75) Inventors: Michael David Simmonds, Ashford (GB); Mohmed Salim Valera, Chatham (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 13/574,109

(22) PCT Filed: Jan. 21, 2011

(86) PCT No.: PCT/GB2011/050097
§ 371 (c)(1),
(2), (4) Date: Jul. 19, 2012

(87) PCT Pub. No.: WO2011/089433
PCT Pub. Date: Jul. 28, 2011

(65) Prior Publication Data
US 2012/0300311 A1 Nov. 29, 2012

(30) Foreign Application Priority Data

Jan. 25, 2010 (EP) .................................... 10275007
Jan. 25, 2010 (GB) .................................. 1001126.0

(51) Int. Cl.
*G02B 27/01* (2006.01)

(52) U.S. Cl.
USPC ........................................................ 359/631

(58) Field of Classification Search
USPC ........................... 359/629–631, 570; 345/7, 8
See application file for complete search history.

(56) References Cited

U.S. PATENT DOCUMENTS 6,728,034 B1 4/2004 Nakanishi et al.
2002/0122015 A1 9/2002 Song et al.

FOREIGN PATENT DOCUMENTS

| EP | 2 133 727 A1 | | 12/2009 | |
|----|---|---|---|---|
| WO | WO 03/010587 | * | 2/2003 | ............ G02B 27/01 |
| WO | WO 03/010587 A1 | | 2/2003 | |
| WO | WO 2007/029032 | * | 3/2007 | ............ G02B 27/01 |
| WO | WO 2007/029032 A1 | | 3/2007 | |
| WO | WO 2007/141588 A1 | | 12/2007 | |
| WO | WO 2008/117341 A1 | | 10/2008 | |
| WO | WO 2009/101236 A1 | | 8/2009 | |

OTHER PUBLICATIONS

International Search Report dated Feb. 25, 2011 issued in PCT/GB2011/050097.

(Continued)

*Primary Examiner* — Joseph P Martinez
(74) *Attorney, Agent, or Firm* — Scully, Scott, Murphy & Presser, PC

(57) ABSTRACT

The present invention relates to a projection display (10) for displaying an image to a viewer, comprising a curved waveguide (14) made of light transmissive material and having first and second opposed curvilinear surfaces (26, 28), an image-providing light source device arranged to inject collimated image bearing light into the waveguide, an input grating (20) coupled to or within the waveguide to diffract said image bearing light to propagate internally along the curved waveguide by total internal reflection, an output grating (22) provided along a side of the waveguide by which the image bearing light is diffracted out of the waveguide for viewing by the viewer, wherein the input grating and output grating have variable pitch gratings so that a collimated image injected into the waveguide can be output from the waveguide as a collimated image having an increased exit pupil.

12 Claims, 7 Drawing Sheets

(56) References Cited

OTHER PUBLICATIONS

Extended European Search Report dated May 3, 2010 issued in EP 10275007.2.

UK Search Report dated Jun. 24, 2010 issued in GB1001126.0.
International Preliminary Report on Patentability and Written Opinion, dated Aug. 9, 2012 from related International Application No. PCT/GB2011/050097.

* cited by examiner

Angle of incidence along exit pupil with powered gratings

Fig. 14. Chromatic errors across axial pupil

PROJECTION DISPLAY

The present invention relates to a projection display comprising a curved waveguide and also although not exclusively to a helmet or head mounted curved waveguide display, incorporated into a visor.

Known helmet or head worn displays use flat waveguides which act as a combiner and to expand the small exit pupil of the image source. In such optical systems the waveguides contain no optical power apart from the linear diffractive power of the gratings that are used to inject light into and out of the waveguides.

Such displays are essentially eyepiece designs that require the addition of an optical module and combiner to the head or helmet of the user. This is undesirable for many reasons. The addition of mass and volume to head/helmet mounted display is well understood to be problematic. The use of a glass waveguide combiner in front of the user's eye presents many problems with safety.

The ability to use a visor as a waveguide display would overcome such problems. Alternatively the use of the same structure as a goggle or a pair of spectacles would also prove advantageous.

The present invention provides a projection display for displaying an image to a viewer, comprising a curved waveguide made of light transmissive material and having first and second opposed curvilinear surfaces, an image-providing light source device arranged to inject collimated image bearing light into the waveguide, an input grating coupled to or within the waveguide to diffract said image bearing light to propagate internally along the curved waveguide by total internal reflection, an output grating provided along one of the surfaces of the waveguide by which the image bearing light is diffracted out of the waveguide for viewing by the viewer, wherein the input grating and output grating have variable pitch gratings so that a collimated image injected into the waveguide can be output from the waveguide as a collimated image having an increased exit pupil.

Accordingly, the projection display may be incorporated into a curved visor or helmet which is head mounted so that an additional optical module and combiner is not required, reducing weight and head maneuverability.

The pitches of the input grating and the output grating may vary in accordance with the radius of curvature of the first and second curvilinear surfaces of the waveguide.
The pitch of the input grating may increase in a propagation direction and the pitch of the output grating may decrease in a propagation direction. The pitch of the input and output gratings may vary linearly in the propagation direction, or alternatively have a polynomial variation in the propagation direction.

The pitches of the gratings may also vary according to the thickness of the visor between first and second opposed curvilinear surfaces.

The output grating may output rays at a plurality of angles of incidence, the rays outputted at any one angle of incidence being collimated to provide an extended field of view.

The input and output gratings may have conjugated diffractive power to correct chromatic aberration.

The input grating may be configured according to the curvature of the input grating, and the curvilinear surfaces of the waveguide to provide a continuous wave at the output grating and the output grating may be configured according to the curvature of the output grating to provide a collimated image across the exit pupil.

The waveguide is preferably cylindrical and has curvilinear surfaces with generally equal radiuses of curvature. The surfaces are preferably parallel in that the surfaces are either both convex or both concave.

The present invention also provides a head mounted display, a helmet mounted display, pair of goggles, or spectacles comprising or incorporating the projection display as described above.

In order that the present invention may be well understood, some embodiments thereof, which are given by way of example only, will now be described with reference to the accompanying drawings, in which:

FIG. 14 shows a plot of the angle of incidence at the exit pupil of light coupled out of waveguide of the display shown in FIG. 13.

Figure 1:
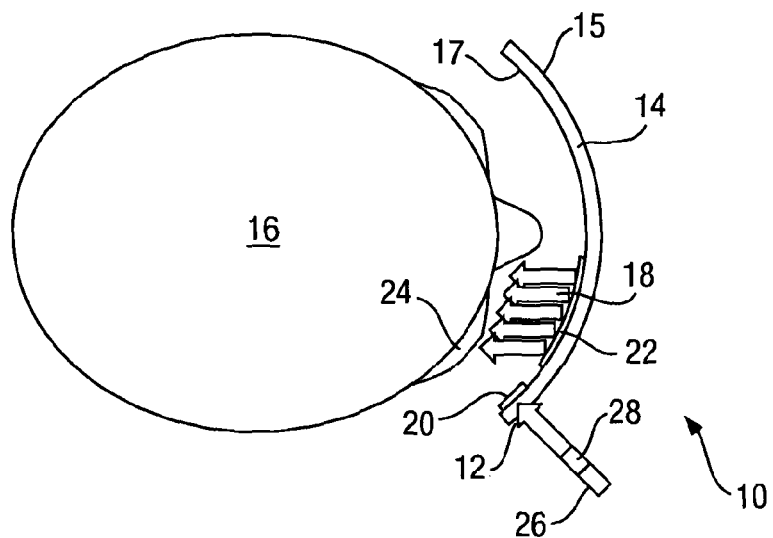
FIG. 1 shows a curved, or cylindrical, waveguide display in the form a visor work by a user.

Referring to FIG. 1, a device 10 is shown which allows a collimated image 12 to be injected into a curved cylindrical waveguide 14, which may be a visor of a helmet, goggle or spectacle, made of light transmissive material such as glass or plastics. The cylindrical waveguide has first and second opposed curvilinear surfaces 15, 17. The term cylindrical means that the curvilinear surfaces have equal radius of curvatures, or are closely matched in radius, such that the surfaces have generally equal and opposite optical power along their lateral extent between the input and output gratings.

The image is output to the eye of a user 16 as a collimated display 18 with an expanded exit pupil. The collimated image 12, which has a small exit pupil and a large field of view, is injected into the cylindrical waveguide 14. An input grating 20 is arranged to trap the image bearing light within the waveguide under total internal reflection (TIR). Thus the image bearing light travels along the waveguide reflecting internally from opposing sides of the waveguide until it is incident upon an output grating 22 that outputs the image to the user's eye 24. The output grating acts as a combiner for the display combining the injected image over laid on a scene viewed by the user through the grating 22. Due to the multiple interactions with the output grating the image has an expanded exit pupil. The device can produce a large field of view and across a finite input exit pupil. The image can also be chromatically corrected.

The image-providing light source device includes an image generating light source 26 preferably in the form of a microdisplay to provide a display of information. Additionally the image-providing light source device includes an optical means 28 located between the image generating light source 26 and the first side 15 of the cylindrical waveguide 14. The optical means 28 is operable to collimate light received from the image generating light source 26 and inject the collimated image bearing light into the waveguide 14 through the first side 15 thereof. The optical means 28 preferably is of a small size, typically less than 25 millimeters in diameter, and is used to collimate the light received from the image generating light source 26. The collimated light produced by the optical means 28 has a small exit pupil and is therefore fed into the waveguide 14 which performs the function of stretching the horizontal and vertical pupils.

Successful collimation of the image at the output grating 22 requires a continuous wavefront of light along its length. This wavefront must be continuous at the output grating regardless of the position of the ray at the input pupil and its position within the field of view of the display. In known waveguide display devices, the waveguide or waveguides have a substantially rectangular cross-section so that the relative field angles of the light incident on opposing parallel sides of the waveguide during propagation are preserved within the waveguide and the information required to regenerate the original image is thus preserved.

Figure 2:
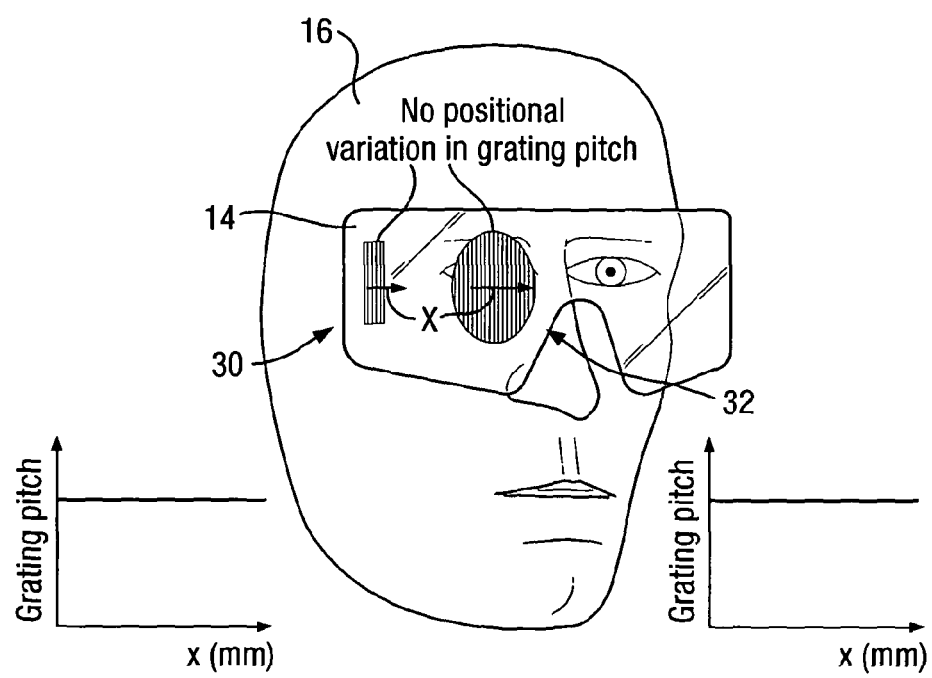
FIG. 2 shows a cylinder waveguide with prior art input and output gratings.

Unlike the uniform rectangular cross-section waveguide in known display devices, in device 10, the waveguide 14 has cylindrical optical power at each interaction along its length. FIG. 2 shows a typical prior art input grating 30 and output grating 32 in combination with a cylindrical waveguide such as a visor. It can be assumed that this cylindrical optical power is negligible since the size and shape of the human face requires the curvature of the cylinder to be large, in the order of 100 mm. However, given a representative radius of curvature, analysis shows that this optical power is enough to give a discontinuous wavefront at the output grating. The gratings have a linear diffractive power as shown by the two graphs which illustrate that the grating pitch is constant across each of the gratings. Accordingly, if a collimated beam of light were injected into a cylindrical waveguide via input grating 30 and output similarly via a output grating 32 and these gratings have a linear diffractive power, as in the prior art, then collimation is lost at the eye.

Figure 3:
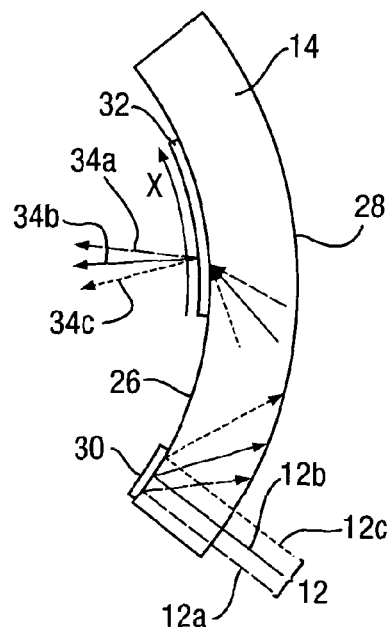
FIG. 3 shows schematically the waveguide and prior art gratings in FIG. 2 with exemplary optical rays coupled into and out of the waveguide.

FIG. 3 shows in more detail the arrangement shown in FIG. 2 having a cylindrical waveguide 14 with known input and output gratings indicated at 30 and 32. As shown in FIG. 3, the collimated injected beam of light 12 experiences alternating divergent and convergent focusing power as it totally internally reflects at respective surfaces 26, 28 of the waveguide 14. FIG. 3 shows three collimated rays 12a, 12b, 12c of the input image 12 injected into the cylindrical waveguide 14. Due to the curvature of the input grating 30 at surface 26, the three rays are diffracted at different divergent angles into the waveguide. Subsequently, the rays are internally reflected along different convergent angles at surface 28. The rays are outputted from the waveguide by diffraction at the output grating 32. The output rays 34a, 34b, 34c have an output angle which is dependent on the angle of incidence of the rays 36a, 36b, 36c within the waveguide and the output grating 32.

Since each of the three rays 36a, 36b, 36c propagate along the waveguide at different angles they each have different angles of incidence with the output grating.

In prior art rectilinear waveguides conjugated pairs of gratings are used, such that the diffractive power and dispersion of the first grating cancels that of the second grating. The waveguide itself contains no optical power and acts purely to expand the exit pupil and as a combiner to overlay the image on the outside world. However, as shown in FIG. 3 and as discussed in more detail below, both the waveguide and paired gratings contain optical power. It is therefore necessary to replicate the conjugated nature of the holograms, such that input and output gratings cancel the optical power contained in the system to present collimated light to the viewer.

Figure 4:
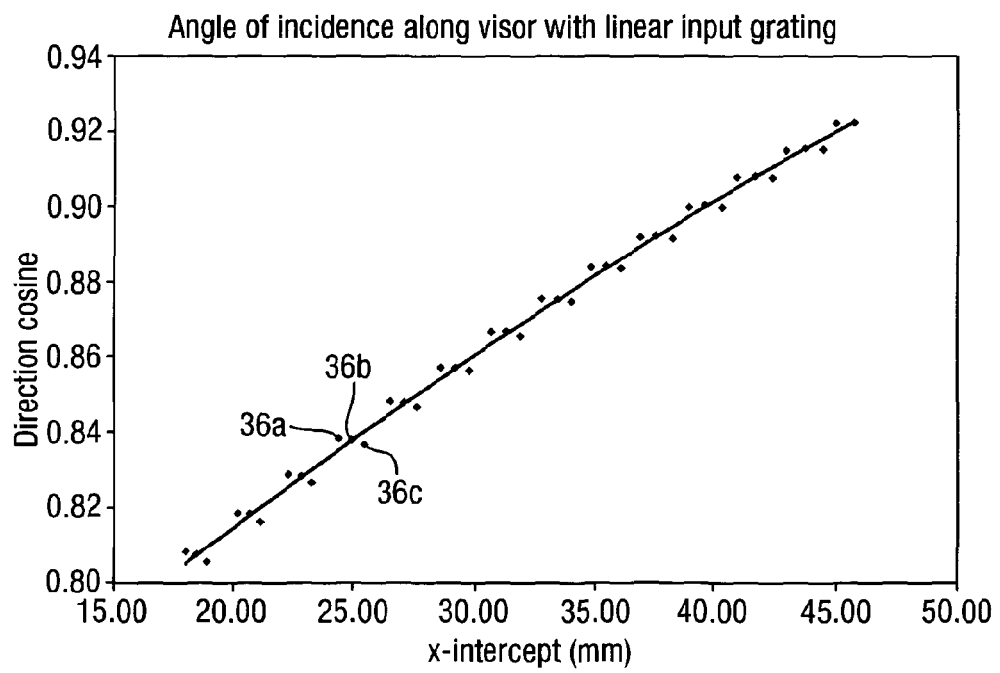
FIG. 4 shows a plot of the angle of incidence along the waveguide of image bearing light coupled into the waveguide by the prior art input grating.

FIG. 4 shows the angles of incidence that rays 36a, 36b, 36c make with the output grating 32 along its length X. It will be seen that the angle of incidence varies depending on the location X at which the internally propagating rays interact with the output grating 32. FIG. 4 clearly shows that at each point on the output hologram there is a range of different angles of incidence.

Figure 5:
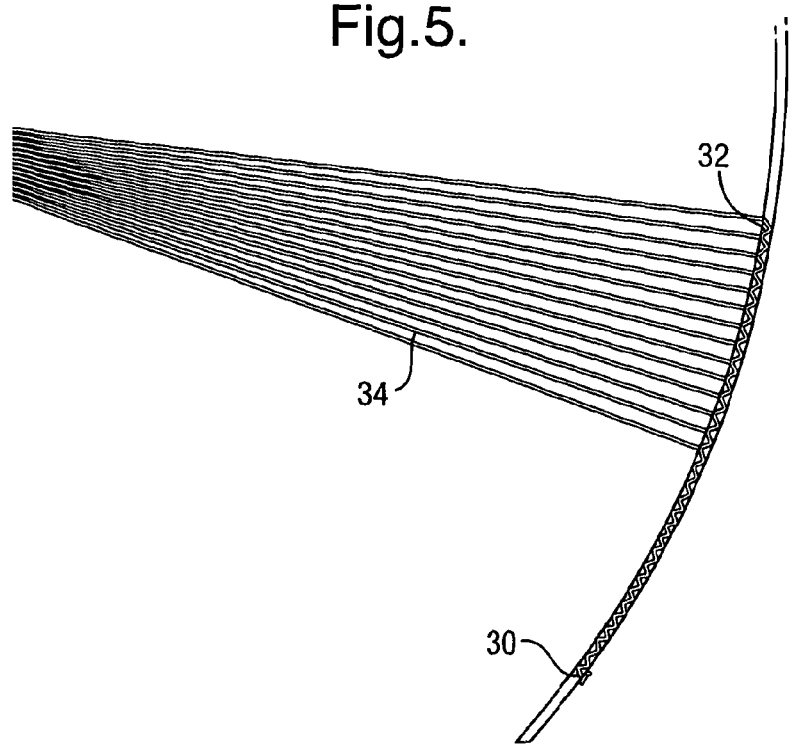
FIG. 5 shows in more detail the output light from the waveguide and gratings shown in FIG. 4.
Figure 6:
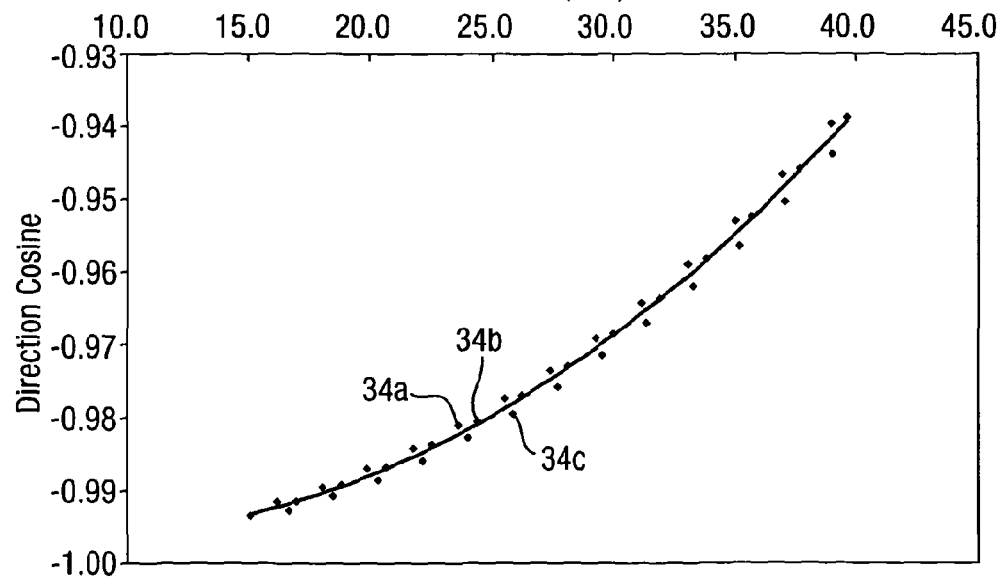
FIG. 6 shows a plot of the angle of incidence along the exit pupil of image bearing light coupled into and out of the waveguide by the prior art input and output gratings.

Secondly, the output grating 32 suffers from the optical power introduced by its cylindrical form. This has the effect of introducing a gross divergence across the output pupil of light as shown in FIG. 5. FIG. 6 shows a final plot of angle of incidence across the exit pupil at the eye. It shows a gross divergence with localised variation in focus across the pupil width.

Figure 7:
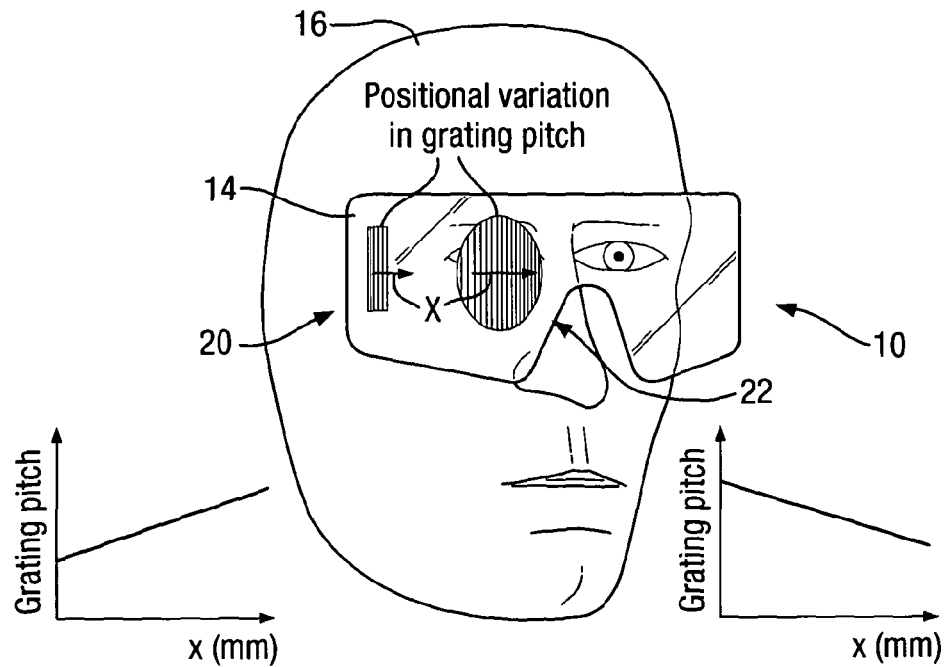
FIG. 7 shows the cylindrical waveguide display shown in FIG. 1.

The device 10 as shown in FIG. 1 relies on a variation of diffractive power across the input and output gratings to overcome the problems described above. As shown in FIG. 7, the fringes of the input grating and the output grating are each arranged to compensate for the curvature of the cylindrical waveguide at the input and output gratings. It will be seen that the fringes of the input and output gratings are each aligned vertically and the pitch is varied horizontally in the direction of propagation. As shown the pitch of the input grating 20 decreases linearly in the lateral direction in the direction of propagation of light. The pitch of the output grating 22 increases linearly in the lateral direction in the direction of propagation of light. It is preferable that the variation in grating pitch has a polynomial function with respect to the lateral dimension across the grating. The exact variation in grating pitch is optimised to suit the exact optical prescription, for example the radius of curvature of the waveguide 14. Typically the pitch can be described by a polynomial law as follows:

$$\text{Grating pitch}(x) = \text{base\_pitch} + \text{coeff}_1 \cdot x + \text{coeff}_2 \cdot x^2 + \ldots + \text{coeff}_z \cdot x^z \text{ lines}/\mu$$

Where,
x=position from centre of grating in mm; and.
μ=the fringes per micron

The coefficients 1-z are calculated using standard available optical design software, and in the present case the fringe pitch variation was determined using ZEMAX® optical design software.

Figure 8:
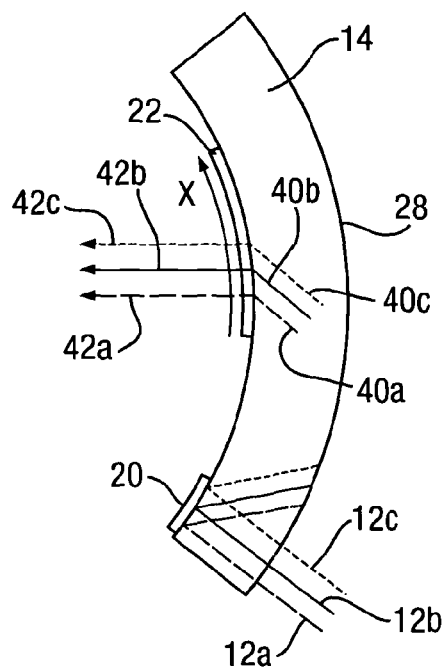
FIG. 8 shows image bearing light coupled into and out of the cylindrical waveguide display shown in FIG. 1.

FIG. 8 shows in more detail three input rays 12a, 12b, 12c of an image 12 which is input to the waveguide 14. Input grating has a fringe pitch which varies across its lateral extent and diffracts the input rays so that they propagate along the waveguide by TIR. The internally propagating rays 40a, 40b, 40c propagate along the waveguide until they interact with output grating 22 which diffracts the rays of the waveguide as output rays 42a, 42b, 42c. It will be seen that the variable pitch input grating produces a wavefront which is continuous at the output grating regardless of the position of the ray at the input pupil and its position within the field of view of the display.

Figure 9:
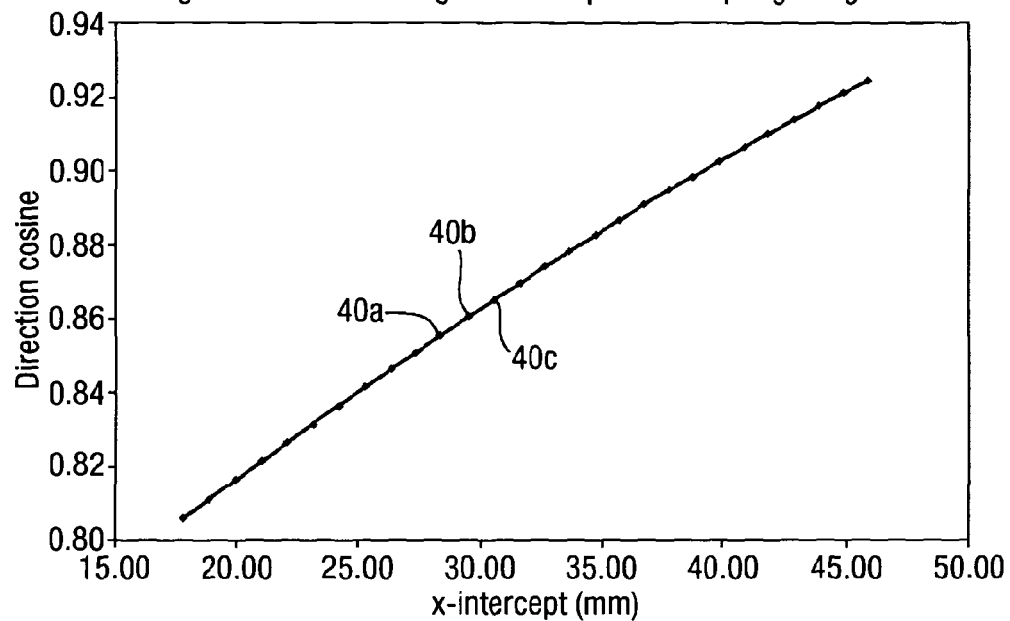
FIG. 9 shows a plot of the angle of incidence along the waveguide of image bearing light coupled into the waveguide of the display shown in FIG. 1.
Figure 10:
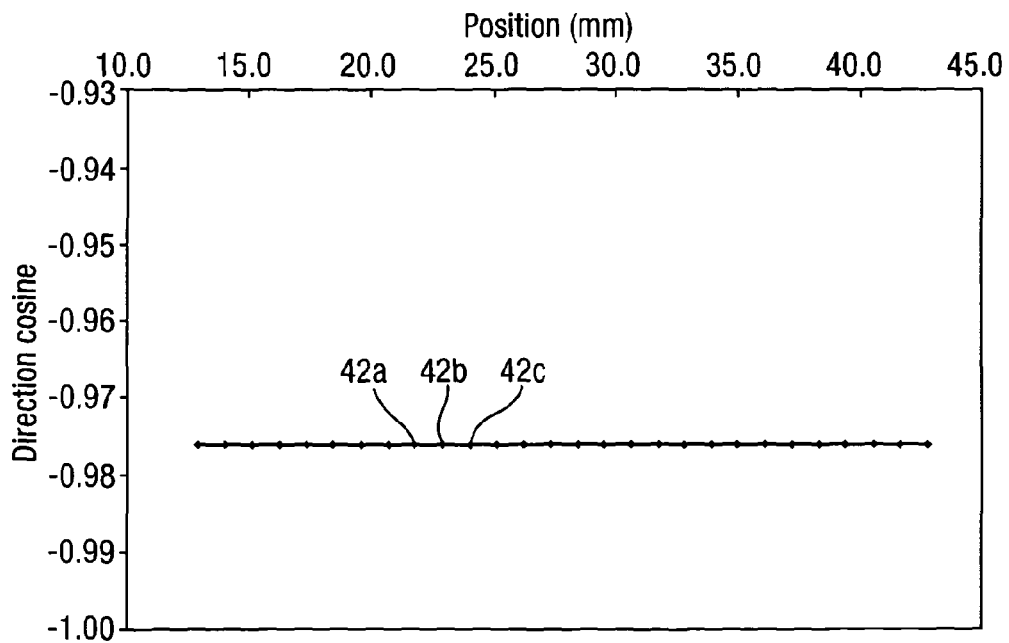
FIG. 10 shows a plot of the angle of incidence at the exit pupil of light coupled out of waveguide of the display shown in FIG. 1.

FIG. 9 shows a plot of the angle of incidence at the output grating for the three rays 40a, 40b, 40c which shows that the continuous wavefront has been provided at the output grating. As shown in FIG. 10, once this continuous wavefront has been achieved the grating pitch across the output hologram 22 is arranged to diffract collimated output rays 42a, 42b, 42c for viewing by user 16 across the exit pupil. Each of the output rays 42a, 42b, 42c have the same angle of incidence.

The device 10 is able to provide an extended field of view so that image 12 can be viewed from a plurality of different location of the eye of a user relative to the device. Careful optimisation of the radius of curvature of the visor, the thickness of the visor, and the polynomial variation of the grating pitch for the input and output grating allows an extended field of view for a representative optical layout.

Figure 11:
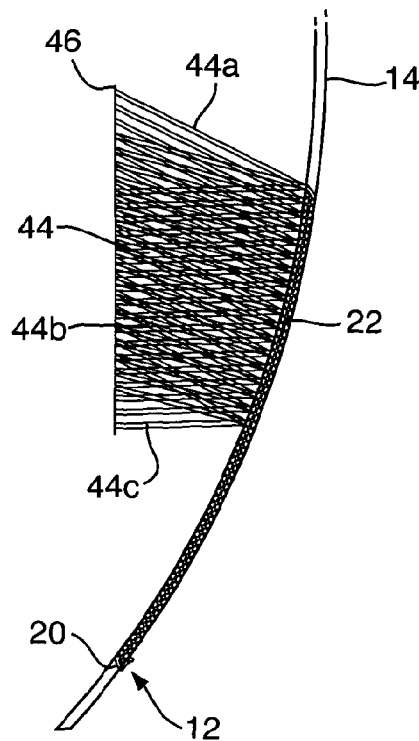
FIG. 11 shows the FIG. 1 display modified to allow an increased field of view at the exit pupil.
Figure 12:
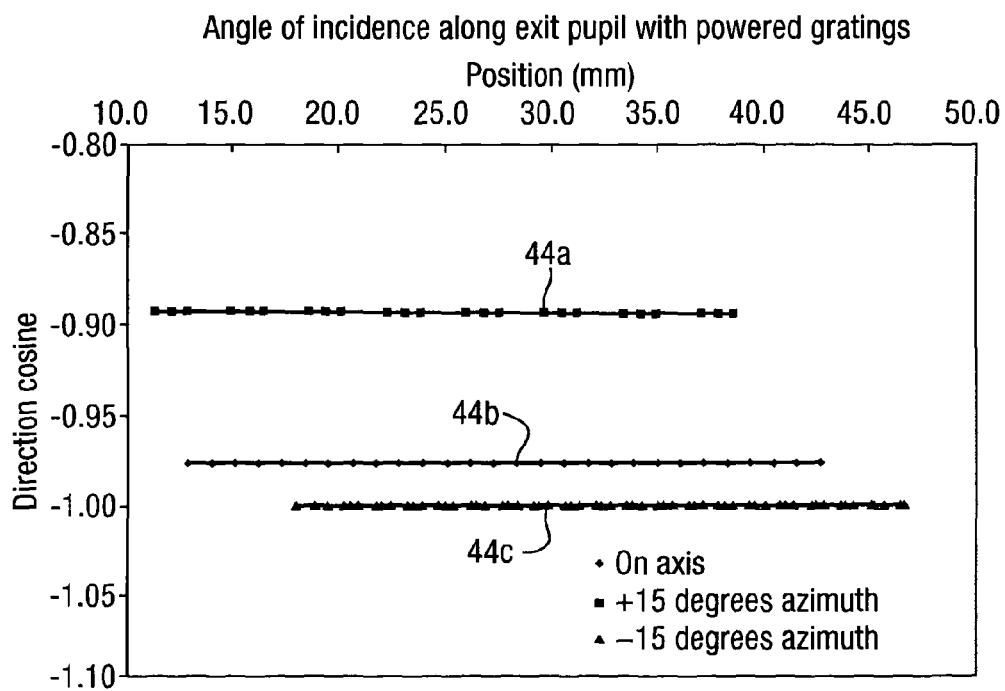
FIG. 12 shows a plot of the angle of incidence at the exit pupil of light coupled out of waveguide of the display shown in FIG. 11.

FIG. 11 shows the waveguide 14 having an injected image 12 coupled into the waveguide by the input grating 20. The output grating 22 outputs rays 44 at a 30° total field of view having collimated rays 44a (at +15° azimuth), 44b (at 0° on axis) and 44c (at −15° azimuth) at the exit pupil 46. As shown in the plot in FIG. 12, each of the output rays 44a, 44b and 44c are collimated allowing viewing of the image at +15° azimuth, on axis and at −15° azimuth.

Figure 13:
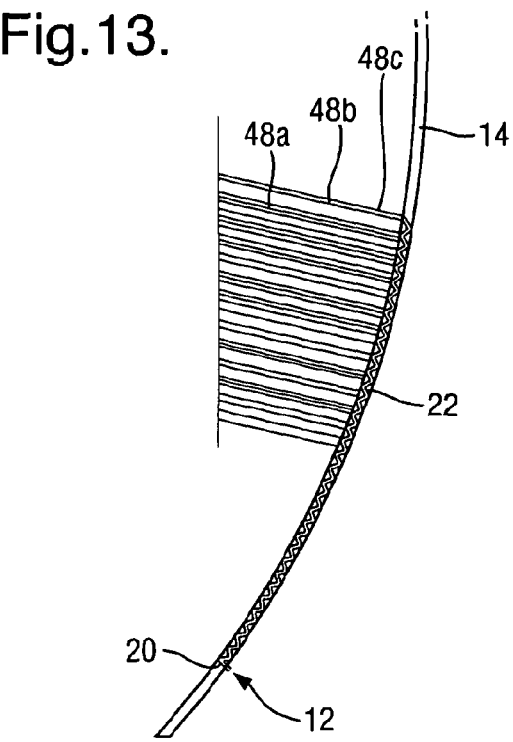
FIG. 13 shows the FIG. 1 display modified to correct for chromatic aberration at the exit pupil.
Figure 13:
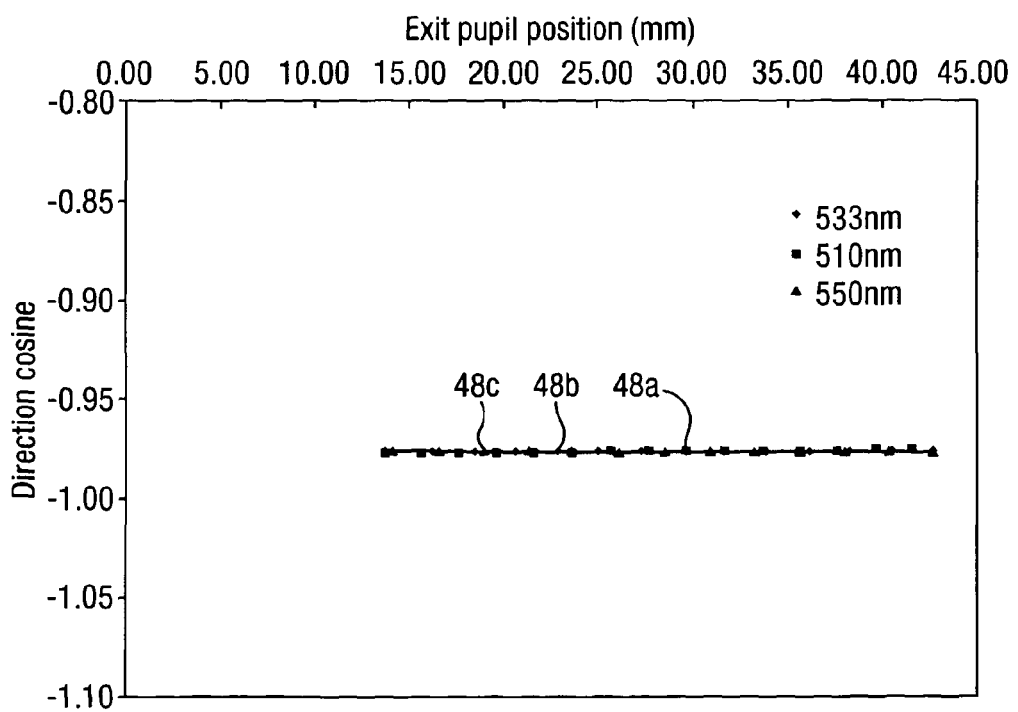

In a further arrangement of the device 10, the input and output diffractive elements 20, 22 have generally conjugated diffractive power to allow chromatic correction to occur between the input and output gratings. The variation of the input and output grating pitch across the visor surface may generate a lack of diffractive conjugation for certain rays. However, suitable optimisation of the radius of curvature of the visor, the thickness of the visor, and the polynomial variation of the grating pitch for the input and output gratings, can minimise chromatic aberration. In this arrangement of the device 10 shown in FIG. 13, the waveguide 14 has an injected image 12 coupled into the waveguide by the input grating 20. The output grating 22 outputs rays 48 having three different wavelengths representing 510 nm (48a), 533 nm (48b) and 550 nm (48c) in the visible spectrum. As shown rays 48a, 48b and 48c are collimated and on axis. As shown in the plot in FIG. 14, each of the output rays 48a, 48b and 48c are collimated allowing viewing of the image with good chromatic correction.

The invention claimed is:

1. A projection display for displaying an image to a viewer, comprising a curved waveguide made of light transmissive material and having first and second opposed curvilinear surfaces, an image-providing light source device arranged to generate and to inject collimated image bearing light into the waveguide, an input grating coupled to or within the waveguide to diffract said image bearing light to propagate internally along the curved waveguide by total internal reflection, an output grating provided along one of the surfaces of the waveguide by which the image bearing light is diffracted out of the waveguide for viewing by the viewer, wherein the input grating and output grating have variable pitch gratings so that a collimated image injected into the waveguide can be output from the waveguide as a collimated image having an increased exit pupil.

2. A projection display as claimed in claim 1, wherein the pitches of the input grating and the output grating vary in accordance with the radius of curvature of the first and second curvilinear surfaces of the waveguide.

3. A projection display as claimed in claim 2, wherein the pitch of the input grating increases in a propagation direction and the pitch of the output grating decreases in a propagation direction.

4. A projection display as claimed in claim 3, wherein the pitch of the input and output gratings varies linearly in the propagation direction.

5. A projection display as claimed in claim 3, wherein the pitch of the input and output gratings has a polynomial variation in the propagation direction.

6. A projection display as claimed in claim 1, wherein the pitches of the gratings varies according to the thickness of the visor between first and second opposed curvilinear surfaces.

7. A projection display as claimed in claim 1, wherein the output grating outputs rays at a plurality of angles of incidence the rays outputted at any one angle of incidence being collimated to provide an extended field of view.

8. A projection display as claimed in claim 1, wherein the input and output gratings have generally conjugated diffractive power to correct chromatic aberration.

9. A projection display as claimed in claim 1, wherein the input grating is configured according to the curvature of the input grating, and the curvilinear surfaces of the waveguide to provide a continuous wave at the output grating and the output grating is configured according to the curvature of the output grating to provide a collimated image across the exit pupil.

10. A projection display as claimed in claim 1, wherein the waveguide is cylindrical and has curvilinear surfaces with generally equal radiuses of curvature.

11. A head mounted display, a helmet mounted display, pair of goggles, or spectacles comprising a projection display for displaying an image to a viewer, comprising a curved waveguide made of light transmissive material and having first and second opposed curvilinear surfaces, an image-providing light source device arranged to generate and to inject collimated image bearing light into the waveguide, an input grating coupled to or within the waveguide to diffract said image bearing light to propagate internally along the curved waveguide by total internal reflection, an output grating provided along one of the surfaces of the waveguide by which the image bearing light is diffracted out of the waveguide for viewing by the viewer, wherein the input grating and output grating have variable pitch gratings so that a collimated image injected into the waveguide can be output from the waveguide as a collimated image having an increased exit pupil.

12. A visor for displaying an image to a viewer, comprising a curved visor made of light transmissive material and having first and second opposed curvilinear surfaces to form a waveguide section, an image-providing light source device arranged to generate and to inject collimated image bearing light into the waveguide section of the visor, an input grating coupled to or within the visor to diffract said image bearing light to propagate internally along the visor within the waveguide section by total internal reflection, an output grating provided along one of the surfaces of the visor by which the image bearing light is diffracted out of the visor for viewing by the viewer, wherein the input grating and output grating have variable pitch gratings so that a collimated image injected into the visor can be output from the visor as a collimated image having an increased exit pupil.

* * * * *